(12) United States Patent
Fujimura

(10) Patent No.: US 10,964,311 B2
(45) Date of Patent: Mar. 30, 2021

(54) WORD DETECTION SYSTEM, WORD DETECTION METHOD, AND STORAGE MEDIUM

(71) Applicant: KABUSHIKI KAISHA TOSHIBA, Minato-ku (JP)

(72) Inventor: Hiroshi Fujimura, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 151 days.

(21) Appl. No.: 16/130,538

(22) Filed: Sep. 13, 2018

(65) Prior Publication Data

US 2019/0266997 A1  Aug. 29, 2019

(30) Foreign Application Priority Data

Feb. 23, 2018 (JP) .............................. JP2018-031225
Sep. 11, 2018 (JP) .............................. JP2018-170090

(51) Int. Cl.
| | |
|---|---|
| *G10L 15/16* | (2006.01) |
| *G10L 15/18* | (2013.01) |
| *G10L 15/05* | (2013.01) |
| *G10L 15/14* | (2006.01) |
| *G10L 15/187* | (2013.01) |
| *G10L 15/02* | (2006.01) |

(52) U.S. Cl.
CPC .............. *G10L 15/14* (2013.01); *G10L 15/02* (2013.01); *G10L 15/05* (2013.01); *G10L 15/187* (2013.01); *G10L 2015/025* (2013.01)

(58) Field of Classification Search
None
See application file for complete search history.

(56) References Cited

U.S. PATENT DOCUMENTS

| | | | |
|---|---|---|---|
| 9,691,378 B1 * | 6/2017 | Meyers | .................... G10L 15/04 |
| 2009/0055185 A1 * | 2/2009 | Nakade | .................... G10L 15/30 |
| | | | 704/257 |

(Continued)

FOREIGN PATENT DOCUMENTS

| | | |
|---|---|---|
| JP | 2016-177474 | 10/2016 |
| JP | 2018-155957 A | 10/2018 |

OTHER PUBLICATIONS

U.S. Appl. No. 15/691,159, filed Aug. 30, 2017, Hiroshi Fujimura.

(Continued)

*Primary Examiner* — Seong-Ah A Shin
(74) *Attorney, Agent, or Firm* — Oblon, McClelland, Maier & Neustadt, L.L.P.

(57) ABSTRACT

According to one embodiment, a word detection system acquires speech data including a plurality of frames, generates the speech characteristic amount, calculates a frame score by matching a reference model based on the speech characteristic amount associated with a target word with the frames in the speech data, calculates a first score of the word from the frame score, detects the word from the speech data based on the first score, calculates a second score of the word based on time information on the start and the end of the detected word and the frame score, compares the value of the second score with the second scores of a plurality of words, and determines a word to be output based on the comparison result.

8 Claims, 10 Drawing Sheets

(56) References Cited

U.S. PATENT DOCUMENTS

| | | | |
|---|---|---|---|
| 2011/0288862 A1* | 11/2011 | Todic | G10H 1/368 |
| | | | 704/235 |
| 2015/0302855 A1* | 10/2015 | Kim | G10L 15/22 |
| | | | 704/275 |
| 2016/0275405 A1* | 9/2016 | Nasu | G10L 15/14 |
| 2016/0275951 A1* | 9/2016 | Strope | G10L 15/26 |
| 2017/0256255 A1* | 9/2017 | Bocklet | G06F 16/685 |
| 2018/0268809 A1* | 9/2018 | Fujimura | G10L 15/02 |
| 2019/0043488 A1* | 2/2019 | Bocklet | G06N 7/005 |

OTHER PUBLICATIONS

J. Junkawitsch et al., "A new keyword spotting algorithm with pre-calculated optimal thresholds", Proceeding of Fourth International Conference on Spoken Language Processing (ICSLP 96), Oct. 3-6, 1996, pp. 2067-2070.

* cited by examiner

| ID | Phoneme | Threshold score | ... |
|---|---|---|---|
| $w_1$ | ... | ... | ... |
| $w_2$ | ... | ... | ... |
| $w_3$ | ... | ... | ... |
| $w_4$ | ... | ... | ... |
| ⋮ | ⋮ | ⋮ | ⋮ |

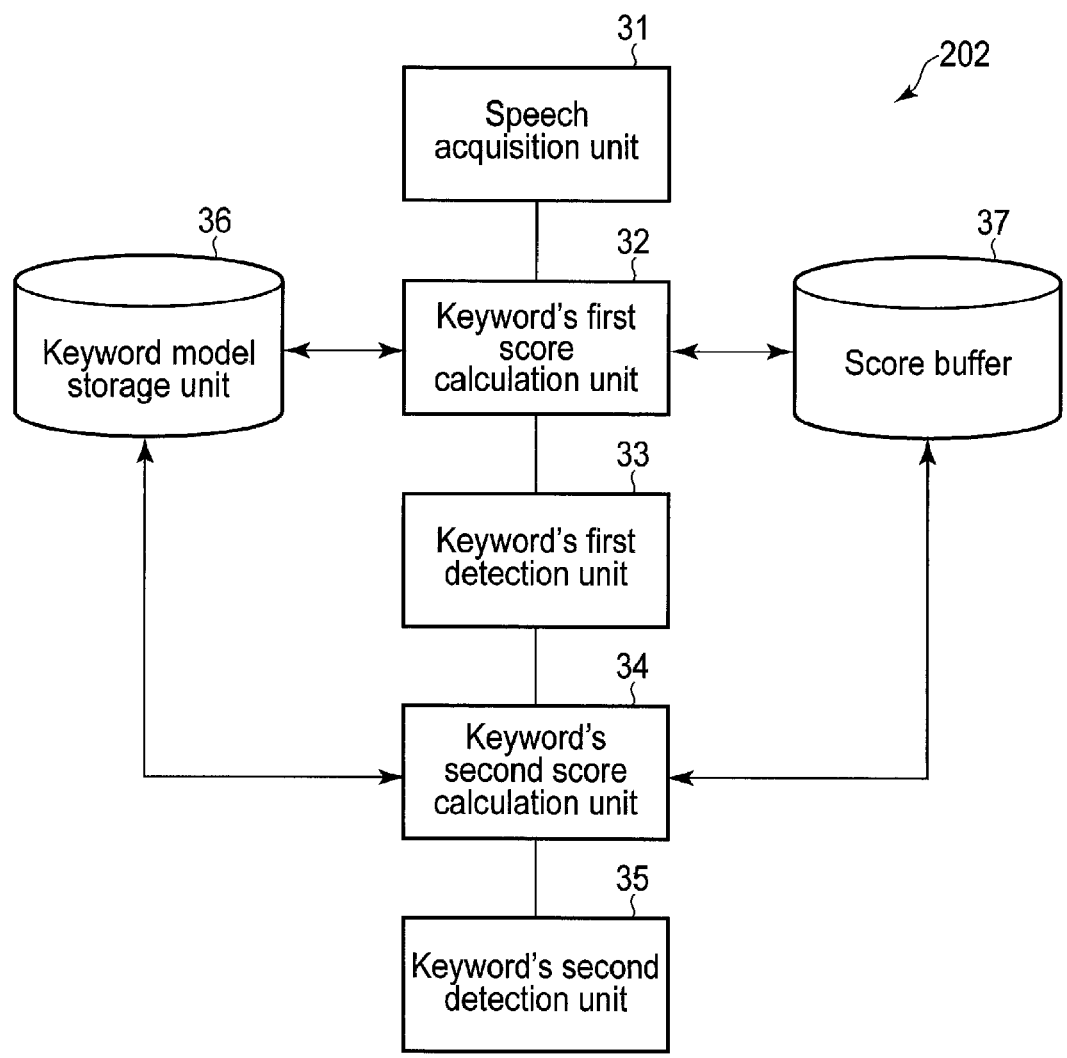
F I G. 3

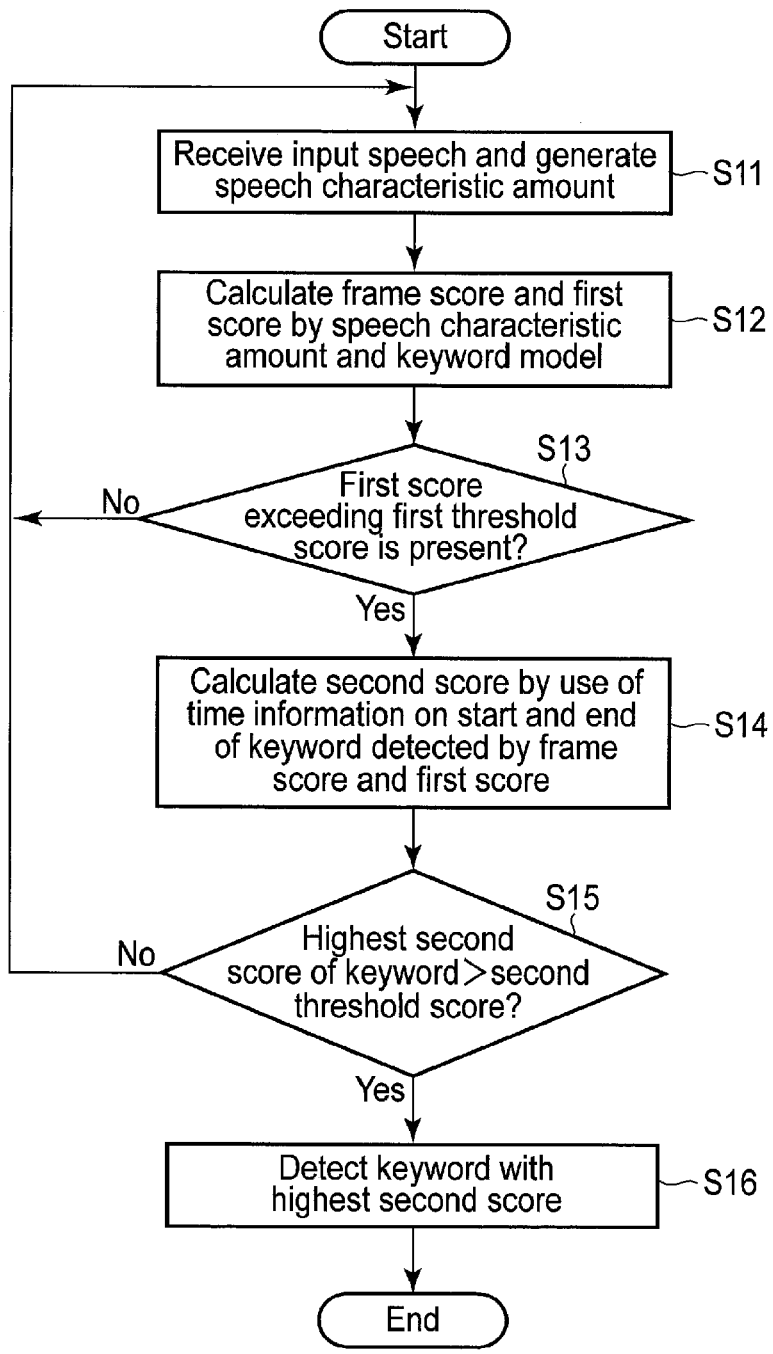
F I G. 4

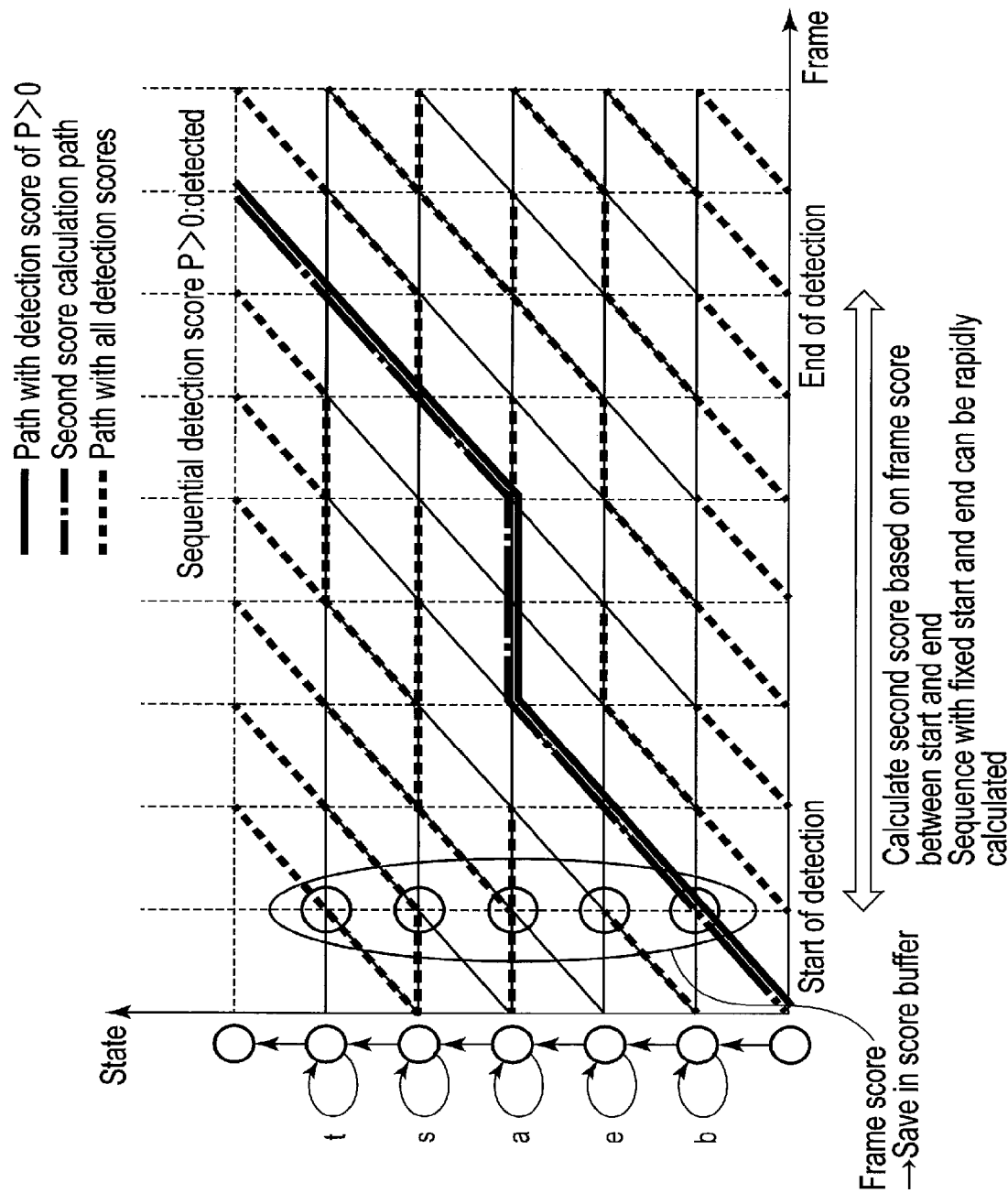
F I G. 6

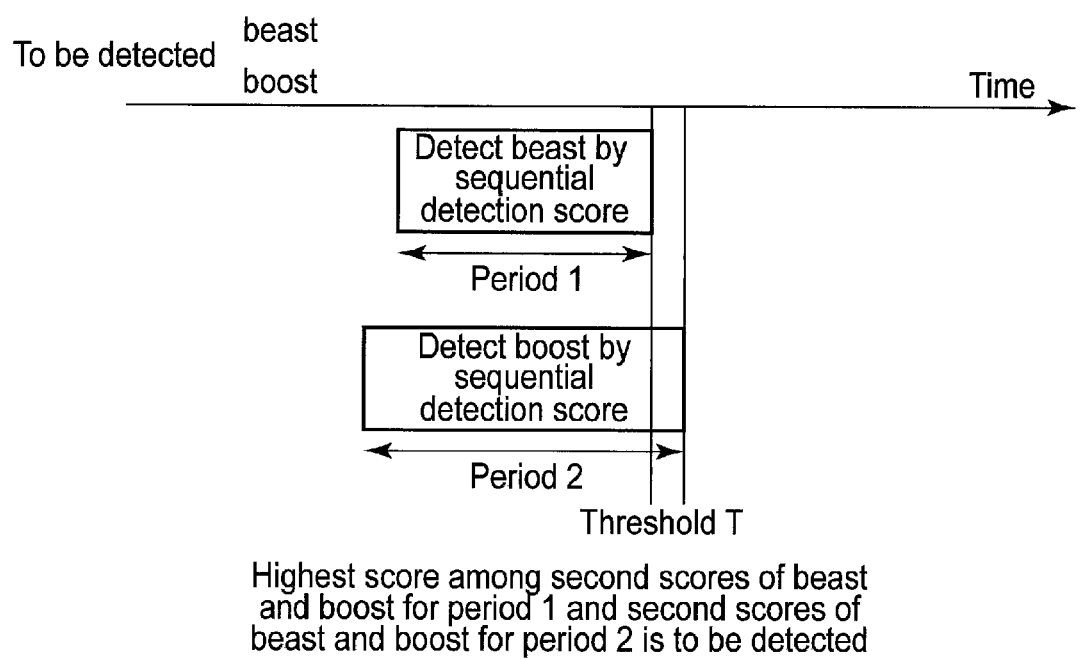
F I G. 11

WORD DETECTION SYSTEM, WORD DETECTION METHOD, AND STORAGE MEDIUM

CROSS-REFERENCE TO RELATED APPLICATIONS

This application is based upon and claims the benefit of priority from Japanese Patent Applications No. 2018-031225, filed Feb. 23, 2018; and No. 2018-170090, filed Sep. 11, 2018, the entire contents of all of which are incorporated herein by reference.

FIELD

Embodiments described herein relate generally to a word detection system, a word detection method, and a storage medium.

BACKGROUND

In recent years, various devices comprising the functions of detecting a specific keyword from user's speech and starting a specific operation corresponding to the detected keyword have increased. Thereby, a user can cause a device to perform a desired operation only by speaking a keyword for the operation without a complicated operation.

As described above, a conventional word detection system can cause an electronic device to perform a desired operation only by speaking a keyword corresponding to the desired operation without a complicated operation. However, there is a problem that other operation is performed due to erroneous detection of a keyword or an operation is delayed due to a time lag based on a long time to detect a keyword.

BRIEF DESCRIPTION OF THE DRAWINGS

FIG. 3 is a functional block diagram illustrating the processing functions of the spoken keyword detection apparatus according to the embodiment;

FIG. 4 is a flowchart illustrating a flow of the processings of the spoken keyword detection apparatus according to the embodiment;

FIG. 6 is a state transition diagram illustrating specific operations of a keyword's second score calculation unit as a first embodiment in the spoken keyword detection apparatus according to the embodiment by way of example;

FIG. 11 is a conceptual diagram illustrating a third example of the comparison processing for second scores according to the second embodiment.

DETAILED DESCRIPTION

In general, according to one embodiment, a word detection system includes an acquisition device, a first calculator, a holder, a detector, a second calculator, and a processor. The acquisition device acquires speech data including a plurality of frames and generates the speech characteristic amount. The first calculator calculates a frame score by matching a reference model based on the speech characteristic amount associated with a target word with the frames in the speech data, and calculates a first score of the word from the frame score. The holder holds the frame score of the word. The detector detects the word from the speech data based on the first score, and outputs time information on the start and the end of the detected word. The second calculator calculates a second score of the word based on the time information on the start and the end of the detected word and the frame score held in the holder. The processor compares the value of the second score with the second scores of a plurality of words or a preset threshold score or with both of them, and determines a word to be output based on the comparison result.

Embodiments of the present invention will be described below with reference to the drawings.

Figures 1, 5:
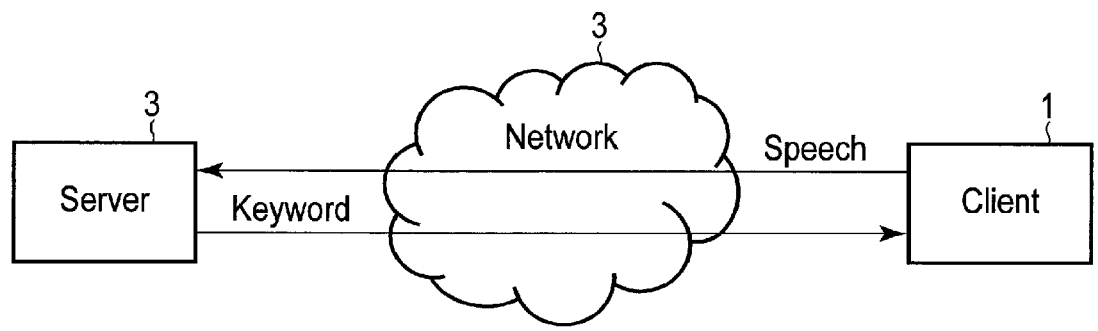
FIG. 1 is a block diagram schematically illustrating a spoken keyword detection system according to an embodiment.
FIG. 5 is a diagram illustrating exemplary data stored in a keyword model storage unit in the spoken keyword detection apparatus according to the embodiment.

FIG. 1 illustrates an exemplary configuration of a spoken keyword detection system comprising a spoken keyword detection apparatus according to an embodiment. The spoken keyword detection system comprises a client apparatus (denoted as client below) 1 and a server apparatus (denoted as server below) 2. The server 2 can be realized as a server computer, for example. The client 1 can be realized as a portable information terminal such as tablet computer, Smartphone, cell phone, or PDA, a personal computer, or a system incorporated in various electronic devices. The client 1 and the server 2 can exchange data via a network 3. At least one of the client 1 and the server 2 comprises a spoken keyword detection function of detecting a keyword from speech.

In the spoken keyword detection system, a keyword can be detected from speech data (speech signal) generated by a microphone or the like provided in the client 1. More specifically, the client 1 transmits the speech data generated by the microphone or the like provided in the client 1 to the server 2 via the network 3. The server 2 detects a keyword from the speech data received from the client 1 by the spoken keyword detection function, and transmits the keyword to the client 1 via the network 3. Thereby, the client 1 can start a specific operation according to the detected keyword, for example. The client 1 may transmit not the speech data but the speech characteristic amount (such as speech characteristic vector sequence) generated by use of the speech data to the server 2. The server 2 can detect a keyword from the received speech characteristic amount and transmit the keyword to the client 1.

Further, the spoken keyword detection function may be provided in the client 1. In this case, the client 1 can detect a keyword from speech data generated by the microphone or the like provided in the client 1 by use of the spoken keyword detection function.

In this way, according to the present embodiment, a keyword can be detected from speech data by the spoken keyword detection function in at least one of the client 1 and the server 2. The client 1 comprising the spoken keyword detection function will be assumed below as a spoken keyword detection apparatus 10 according to the present embodiment by way of example in order to provide a comprehensible explanation.

Figure 2:
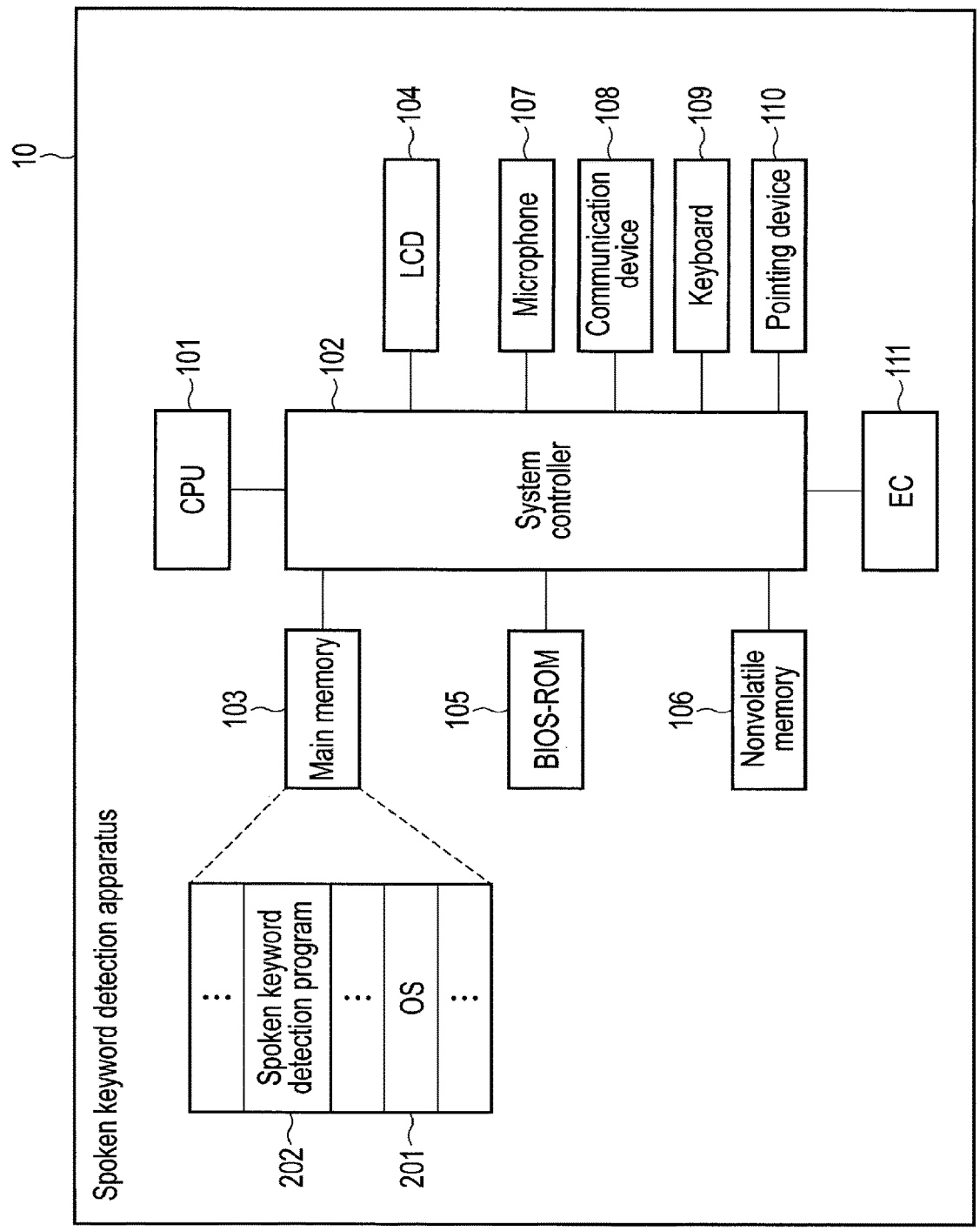
FIG. 2 is a block diagram illustrating a specific configuration of a spoken keyword detection apparatus according to the embodiment.

FIG. 2 is a block diagram illustrating a system configuration of the spoken keyword detection apparatus 10. The spoken keyword detection apparatus 10 comprises a CPU 101, a system controller 102, a main memory 103, a LCD 104, a BIOS-ROM 105, a nonvolatile memory 106, a microphone 107, a communication device 108, a keyboard 109, a pointing device 110, and an embedded controller (EC) 111.

The CPU 101 is a processor configured to control the operations of various components in the spoken keyword detection apparatus 10. The CPU 101 executes various programs loaded from the nonvolatile memory 106 as storage device into the main memory 103. The programs include an operating system (OS) 201 and various application programs. The application programs include a spoken keyword detection program 202. The spoken keyword detection program 202 includes a group of commands to detect a keyword from speech data.

The CPU 101 performs a basic I/O system (BIOS) stored in the BIOS-ROM 105. BIOS is a hardware control program.

The system controller 102 is a device configured to connect a local bus of the CPU 101 and various components. The system controller 102 incorporates a memory controller configured to control access to the main memory 103. The system controller 102 further incorporates a display controller configured to control the LCD 104 used as a display monitor of the spoken keyword detection apparatus 10. A display signal generated by the display controller is sent to the LCD 104. The LCD 104 displays a screen image based on the display signal.

The system controller 102 further incorporates an audio codec. The audio codec is configured to control the microphone 107. The audio codec generates a speech signal based on speech acquired by the microphone 107 (which is a data sequence indicating a digitally-processed speech waveform and will be denoted as speech waveform below).

The communication device 108 is configured to make wired communication or wireless communication. The communication device 108 includes a transmission unit configured to transmit a signal and a reception unit configured to receive a signal.

The keyboard 109 and the pointing device 110 are configured for user input. The pointing device 110 is configured to detect a point on the screen of the LCD 104 and the motions of the point, such as mouse, touchpad, or touch panel.

The EC 111 is a one-chip microcomputer including an embedded controller for power management. The EC 111 comprises a function of powering on or off the spoken keyword detection apparatus 10 in response to user's operation on the power button.

The thus-configured spoken keyword detection apparatus 10 searches the speech part of a target keyword from a speech waveform, and detects the target keyword from the searched speech part. A device mounting the spoken keyword detection apparatus 10 thereon mounts an application operating in response to a detected keyword. In this way, the spoken keyword detection apparatus 10 mounted on the device operating in response to a keyword is required to always receive speech, to accurately detect the keyword, and to operate at low power and the small calculation amount. The device needs to start operating immediately after receiving a keyword, and is desired to detect a spoken keyword at low delay in order for the user to smoothly operate the device without feeling stress.

When a plurality of keywords to be received by a device are present, there is a method for comparing the scores of candidate keywords spoken in a certain period of time relative to a speech waveform, and discriminating a keyword (word) from the comparison results. To the contrary, as described in JP 2016-177474 A, there is a method for making a binary discrimination as to whether the speech of the respective keywords exceeds a predetermined threshold score in a period of time of a speech waveform by use of a detection-specialized score. The method enables an algorithm with the small calculation amount and a short delay time to be applied. However, the latter binary discrimination method uses a detection-specialized score, and thus two keywords with many identical pronunciations are difficult to discriminate. For example, when the keywords "communication" and "communicator" are set, a difference is present only between "tor" and "tion", and thus if the score of "communica" is higher, both the keywords are detected even if any of "communication" and "communicator" is spoken.

In this way, the spoken keyword detection method for making a binary determination on each spoken keyword to be/not to be detected by use of a detection-specialized score has a problem that all the keywords including the identical pronunciations are detected when many identical pronunciations are included in two or more keywords.

Therefore, according to the present embodiment, a second detection score used for discrimination is calculated thereby to determine whether to receive a keyword based on a detected start time and end time, and a frame score used to calculate a first detection score after the keyword is detected by use of the detection-specialized first detection score. Thereby, a keyword can be rapidly and accurately detected from speech.

FIG. 3 is a block diagram illustrating a functional configuration of the spoken keyword detection program 202 executed by the spoken keyword detection apparatus 10. The spoken keyword detection program 202 comprises a speech acquisition unit 31, a keyword's first score calculation unit 32, a keyword's first detection unit 33, a keyword's second score calculation unit 34, a keyword's second detection unit 35, a keyword model storage unit 36, and a score buffer 37. Each unit in the spoken keyword detection program 202 can read various items of data stored in the keyword model storage unit 36 and write data in the keyword model storage unit 36. The keyword model storage unit 36 is assigned with part of the region of the nonvolatile memory 106, for example.

The keyword model storage unit 36 stores a plurality of keyword models corresponding to a plurality of keywords. A keyword model is determined based on phoneme, phonology, mora, phonetic representation or notation characters of a corresponding keyword.

The speech acquisition unit 31 acquires speech data including a plurality of frames. The speech acquisition unit 31 receives and digitalizes a speech waveform, and outputs the speech characteristic amount per frame as speech data.

The keyword's first score calculation unit 32 calculates a frame score for the speech characteristic amount by use of a keyword model in the keyword model storage unit 36, and calculates a keyword's first score (sequential detection score) from the score. The frame score is saved in the score buffer 37.

The keyword's first detection unit 33 primarily detects a keyword by the determination based on a comparison result between a keyword's first score and a preset threshold score, and when detecting a keyword, outputs the information on the start and the end of the keyword.

The keyword's second score calculation unit 34 calculates a keyword's second score by use of the information on the start and the end of the keyword detected by the keyword's first detection unit 33, and the frame scores saved in the score buffer 37.

The keyword's second detection unit 35 compares the second score of the keyword with the second score of other keyword or a preset threshold, or with both of them, and outputs a keyword with a higher score as a detection result.

A flow of the processings of the spoken keyword detection program 202 will be described.

When the speech acquisition unit 31 acquires speech data including a plurality of frames, the keyword's first score calculation unit 32 calculates the frame scores by matching phoneme, phonology, phonetic representation, mora, or notation characters associated with a keyword with each frame of the speech data, for example, then calculates the first score corresponding to the keyword by use of the frame scores, and saves the frame scores in the score buffer 37.

The keyword's first detection unit 33 then detects a keyword from the speech data based on the first score. More specifically, when the first score for the keyword is higher than a first threshold score, the keyword's first detection unit 33 primarily detects a keyword, and outputs the information on the start and the end of the keyword.

When a keyword is detected from one or more first frames in the frames included in the speech data, for example, the keyword's second score calculation unit 34 calculates a second score by use of the information on the start and the end of the keyword, and the frame scores saved in the score buffer 37.

The keyword's second detection unit 35 then compares the second score of the keyword with the second score of other keyword or a second threshold score for the keyword, and outputs a keyword with a higher score as detection result.

An exemplary procedure of a spoken keyword detection processing performed by the spoken keyword detection apparatus 10 will be described below with reference to the flowchart of FIG. 4. A group of commands included in the spoken keyword detection program 202 are executed by the CPU 101, for example, so that the spoken keyword detection processing is realized.

The speech acquisition unit 31 receives and digitalizes a speech waveform thereby to generate the speech characteristic amounts (step S11). The speech waveform is recorded by the microphone 107 or the like. The speech acquisition unit 31 AD-converts the speech waveform, and generates and outputs characteristic vectors as the characteristic amounts by use of the thus-obtained digital speech data. The speech waveform is AD-converted from analog wave to digital wave by typical AD conversion. The speech acquisition unit 31 samples the analog wave at 16 kHz and represents the amplitude value of a sample of the digital wave in 16 bits in the conversion, for example. The speech acquisition unit 31 cuts out the digital wave per certain period of time. The description will be made here assuming that the speech acquisition unit 31 cuts out the digital wave by 256-point sample with 128-point sample offset. A 256-point sample is assumed as a frame. Thereby, the speech acquisition unit 31 acquires speech data including a plurality of frames.

The speech acquisition unit 31 then calculates Mel Frequency Cepstrum Coefficient (MFCC) characteristic amount—12 dimensions based on the 256-point samples. The speech acquisition unit 31 then buffers the MFCC characteristic amounts for three frames, and outputs 36 dimensions in which the MFCC characteristic amounts for the three frames are coupled as the characteristic amount of the time of the center frame in the three frames. The extracted characteristic amount is not limited to MFCC, and may be the Mel-filter bank characteristic amount, Perceptual Linear Prediction (PLP), the RSTA-PLP characteristic amount, or the pitch characteristic amount, or their f component or AA component, for example. Alternatively, a combination of the characteristic amounts may be employed. The number of coupled frames is not limited to three, and one or more frames, or any number of frames may be coupled. Further, the cutout sample size and the frame cycle are not limited to the above values.

The keyword's first score calculation unit 32 receives the speech characteristic amounts generated by the speech acquisition unit 31, and calculates the frame scores and the keyword's first score by use of the speech characteristic amounts and the keyword models in the keyword model storage unit 36 (step S12).

A specific example will be described below assuming that three keywords "communication", "communicator", and "hello" are to be detected. Many methods for calculating an accumulative score for a vector sequence indicating the speech characteristic amount cut out per frame by use of keyword models for the keywords are present, but the left-to-right hidden Markov model (HMM) and the method described in JP 2016-177474 A are described here by way of example.

At first, the keywords "communication", "communicator", and "hello" are assumed as $w_1$, $w_2$, and $w_3$, respectively. Three models $w_n$ (n=1, 2, 3) are prepared as keyword models for the keywords, respectively. The keywords are represented by left-to-right phoneme HMM. The phoneme HMM assumes each phoneme in the phoneme characters (sequences) "k a my u n i k e i sy on", "k a my u n i k e i t a a", and "h e l o u" indicating the keywords $w_1$, $w_2$, and $w_3$, respectively, as a state. Further, a transition probability between phonemes, as a parameter of the phoneme HMM, is assumed as the same probability in every transition. An output probability is indicated by a phoneme appearance probability (acoustic score) per frame.

According to the present embodiment, a model for calculating the acoustic score (frame score) per frame is assumed as a feed-forward neural network common in a plurality of keywords, and the first score is calculated in the method described in JP 2016-177474 A.

The output phase of the neural network for calculating the acoustic score is configured of 13 output units in which the same phonemes are excluded from the phonemes "k a my u n i k e i sy o n", "k a my u n i k e i t a a", and "h e l o u" indicating the keywords $w_1$, $w_2$, and $w_3$, respectively, and the phoneme "sil" is added to the silence periods. The input phase is configured of 36 input units corresponding to the calculated speech characteristic amounts. The intermediate phase has three layers each having 256 units overlapped. The neural network learns the three words "communication", "communicator", and "hello" including the silent periods by their speech by use of back propagation.

In this way, the phoneme HMM is prepared for the keywords, and the first score S of a keyword in a path reaching the end at the number of frames $t_e$ from the start of speech capture by the phoneme HMM relative to a keyword model $w_n$ is calculated in the method described in JP 2016-177474 A. At this time, the start frame of the phoneme HMM of a path having an average local score $S_n$ at the number of frames $t_e$ for the keyword model $w_n$ is assumed as $t_{ns}$.

The frame score calculated per frame is saved in the score buffer 37. A score buffer capable of storing frame scores for the past 8 seconds is prepared per keyword, and the frame score of each keyword per frame is recorded and held in association with the number of frames t. A score buffer is prepared per keyword here, but a common phoneme score may be shared among keywords and a score buffer may be employed among the keywords.

The keyword's first score calculation unit 32 calculates the score while incrementing the number of frames $t_e$ in the temporal direction. At this time, the calculation amount can be reduced by skipping the score calculation for some frames. The keyword's first score calculation unit 32 uses the average local score $S_n$ as the first score of the keyword.

The keyword models are not limited to being modelled in units of phoneme, and can be modelled in units of phoneme, mora, phonetic representation or notation characters. The average local score calculation method is not limited to the method in JP 2016-177474 A, but an approximation calculation method in J. Junkawitsch et al., "A New Keyword Spotting Algorithm With Pre-calculated Optimal Thresholds", in Proc. ICSLP, pp. 2067-2070, 1996 or the like can be applied, for example. The acoustic score calculation per frame is not limited to the feed-forward neural network, and a recurrent neural network such as LSTM is applicable. Further, the acoustic score per frame can be similarly found also by Gaussian Mixture model.

The keyword's first detection unit 33 compares the keyword's first score (denoted as first score below) with the preset first threshold score thereby to determine whether a keyword having a score exceeding the first threshold score is present (step S13). That is, the keyword's first detection unit 33 compares the average local score $S_n$ previously prepared for the keyword model $w_n$ with the first threshold score $th_n$ for the average local score $S_n$. When n meeting $$th_n < S_n$$

is found for (n=1, 2, 3), the value of n is substituted into m. It is assumed here that "communication" is detected at n=1. Assuming the start time $t_{ms}$ of the keyword, the keyword $w_m$ in the start-end period ($t_{ms}$, $t_e$) is detected. The first threshold score $th_n$ sets a value, for which the harmonic average F value of precision and recall is the highest, for all the keywords by use of the developed speech data set including the keywords. In this case, if the value of the first threshold score $th_n$ is higher, the keyword is difficult to detect, and if the first threshold score $th_n$ is lower, the keyword is easy to detect. The score is multiplied by −1 and the sign of the score can be inverted, and in this case, the keyword is detected when the score is lower than the threshold.

When a keyword exceeding the first threshold score is not present, the processing returns to the procedure in step S11, and the processing of detecting a keyword from the subsequent speech data is continued.

On the other hand, when a keyword exceeding the first threshold score is present, or when a keyword is primarily detected, the keyword's second score calculation unit 34 calculates a keyword's second score (denoted as second score below) $D_m$ for the detected keyword $w_m$ by use of the detection start-end period ($t_{ms}$, $t_e$) of the keyword and the frame scores in the score buffer 37 (step S14). The second score $D_m$ assumes the detection start-end period ($t_{ms}$, $t_e$) as end-points of the keyword $w_m$, and the maximum accumulative score is calculated by the Viterbi algorithm with the start and the end fixed by use of the phoneme HMM of the keyword $w_m$ and the frame scores of the corresponding periods in the score buffer 37, and then the maximum accumulative score is divided by the length of the detection period ($t_e - t_{ms}$) to be normalized. At this time, the second scores $D_2$ and $D_3$ are calculated for the detection start-end period ($t_{ms}$, $t_e$) of the keyword $w_m$ by use of the phoneme HMM of the keywords $w_2$ and $w_3$ and the frame scores in the score buffer 37. The second threshold score $th_{2n}$ (n=1, 2, 3) is previously defined for the second score. The Viterbi algorithm cannot be applied when the detection period ($t_e - t_{ms}$) is shorter than the numbers of phonemes of the respective keywords, and thus a value lower than the second threshold score $th_{2m}$ of the second score preset for the keyword $w_m$ is substituted. The second threshold score $th_{2m}$ can be adjusted similarly to the first threshold score $th_m$. The Viterbi algorithm enables rapid calculations when the end-points are determined, and thus the keyword discrimination scores (second scores) for the detection period ($t_{ms}$, $t_e$) can be calculated without increasing the calculation amount and the delay time.

The period in which the second score is calculated is assumed as detection start-end period ($t_{ms}$, $t_e$), but the start and the end are added with a margin d frame (d>0), respectively, to widen the period and the second score may be found in ($t_{ms} - d$, $t_e + d$) ($t_{ms} > d$). When the end time is provided with the margin d, the processing for the margin d frame needs to be waited. When the Viterbi algorithm is applied forward for the time, the maximum accumulative score can be sequentially calculated per added frame by the characteristics of the algorithm for the period with the fixed start and the changing end. Therefore, the highest second score in the margin d frame may be assumed as the second score of the keyword. If the Viterbi algorithm is performed backward in the temporal direction with the end fixed, a similar result can be caused by the changing start. The maximum score in a combination of the changes in the start and end margins may be assumed as second score. The margin may be assumed at d<0 when it is detected to be wider than the actual start and end positions.

The keyword's second detection unit 35 then detects a word by use of the second score calculated per keyword for the primary detection start-end period ($t_{ms}$, $t_e$) of the keyword $w_m$. That is, the keyword's second detection unit 35 determines the highest second score by use of the seconds scores $D_m$, $D_2$, and $D_3$ of the respective keywords calculated by the keyword's second score calculation unit 34, and whether the highest second score is higher than the second threshold score $th_{2n}$ (n=1, 2, 3) of the corresponding keyword (step S15), and detects the keyword having the highest second score when the highest second score exceeds the second threshold score $th_{2n}$ (step S16). The second score $D_2$ of the keyword $w_2$ is assumed here as the highest second score. At this time, if $th_{22} < D_2$ is met, the keyword $w_2$ is detected. According to the present embodiment, the comparison with both the threshold of the second scores and the second scores of the respective keywords is made for detection, but the comparison with either the threshold of the second scores or the second scores of the respective keywords may be made.

When a keyword having the second score exceeding the second threshold score is not present, the processing returns to the procedure in step S11, and the processing of detecting a keyword from the subsequent speech data is continued.

Exemplary data stored in the keyword model storage unit 36 will be described below with reference to FIG. 5. The data can be read and updated by each unit in the spoken keyword detection program 202.

FIG. 5 illustrates an exemplary configuration of keyword data. Each record includes ID, phoneme, and threshold score, for example. Each record may include at least any of phonology, mora, phonetic representation, and notation characters instead of or in addition to phoneme.

"ID" indicates identification information given to a keyword in the record corresponding to the keyword. "Phoneme" indicates the phonemes corresponding to the keyword. "Threshold score" indicates a threshold of a score detected for the keyword.

The keyword data is used by the keyword's first score calculation unit 32 for calculating a keyword score, by the keyword's first detection unit 33 for detecting a keyword, by the keyword's second score calculation unit 34 for calculating a keyword's second score, and by the keyword's second detection unit 35 for detecting a keyword, for example.

The description of the above embodiment assumes that the client 1 comprises the spoken keyword detection function, but the server 2 may comprise the spoken keyword detection function. In this case, the client 1 transmits speech data based on speech acquired by the microphone to the server 2 on the network 3 via the communication device or the like. The server 2 receives the speech data from the client 1 via the communication device. The server 2 executes the spoken keyword detection program 202 thereby to detect a keyword from the received speech data. The server 2 then transmits the detected keyword to the client 1. Thus, the client 1 transmits the speech data to the server 2 comprising the spoken keyword detection function thereby to acquire the keyword like when the client 1 itself comprises the spoken keyword detection function. There can be configured such that the client 1 comprises the speech acquisition unit 31 and transmits only the speech characteristic amounts as its output to the server 2 and the subsequent processings are performed in the server 2.

The program may be previously installed in a computer apparatus to be realized, or may be stored in a storage medium such as CD-ROM or distributed via a network and installed in a computer apparatus as needed to be realized. The individual components can be realized by use of a storage medium such as memory, hard disc, CD-R, CD-RW, DVD-RAM, or DVD-R incorporated in or externally attached on the computer apparatus as needed.

The spoken keyword detection apparatus will be specifically described by way of example.

First Embodiment

Figure 7:
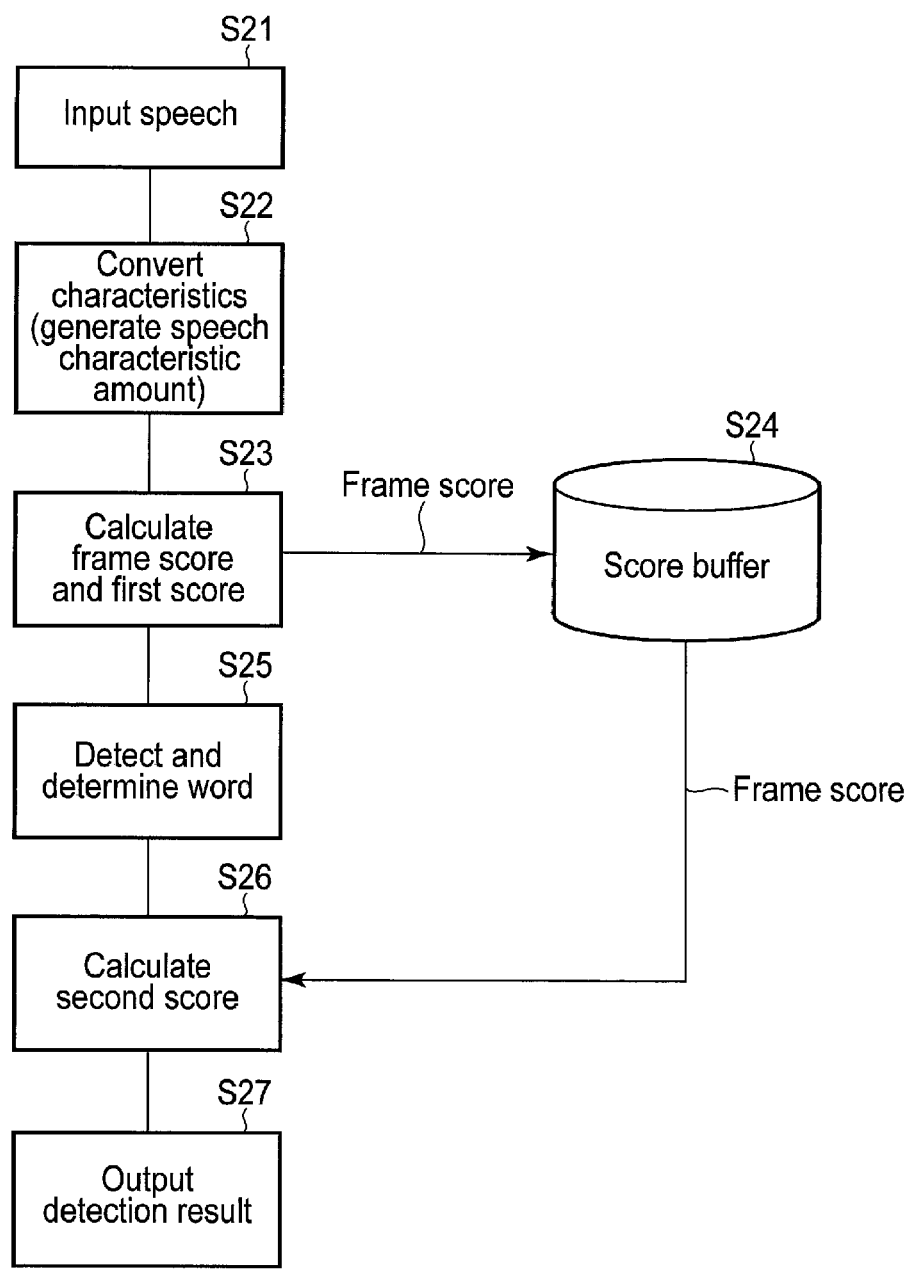
FIG. 7 is a conceptual diagram illustrating a flow of the processings after a second score is calculated from input speech and until a word is determined and output according to the first embodiment.

Specific operations of the keyword's second score calculation unit 34 will be described by way of example assuming that a word "beast" is detected from input speech with reference to FIG. 6 and FIG. 7. FIG. 6 illustrates frame number (frame) on the horizontal axis (temporal axis) and state transition (state) on the vertical axis. The description will be made assuming a detection threshold for the first score of 0. A dotted line in FIG. 6 indicates a path with all the detection scores, a solid line indicates a path having a detection score with a sequential detection score P of P>0, and a chained line indicates a second score calculation path. FIG. 7 illustrates a flow of the processings after the second score is calculated from input speech and until a word is determined and output. According to the present embodiment, when speech is input (step S21), the speech characteristic amount is generated per frame (characteristic conversion) (step S22), the frame score is calculated per frame by the sequential detection score calculation processing (step S23), and the frame score on the start illustrated in FIG. 6 is temporarily saved in the score buffer 37 (step S24). Then, the first score is used to detect and determine a word between the start and the end (step S25), the second score is calculated based on the time information on the start and the end and the frame scores (step S26), and the word detected based on the result of the second score is output (step S27). A sequence score with the start and the end fixed can be rapidly calculated.

In this embodiment, the calculation path of the first score is the same as the calculation path of the second score. But if approximation calculation, in which the calculation of a path is aborted by providing a threshold value to the length of the path or sequential detection score at the time of calculation of sequential detection score, the calculation path of the first score the calculation path of the second score may differ from each other.

Second Embodiment

Figure 8:
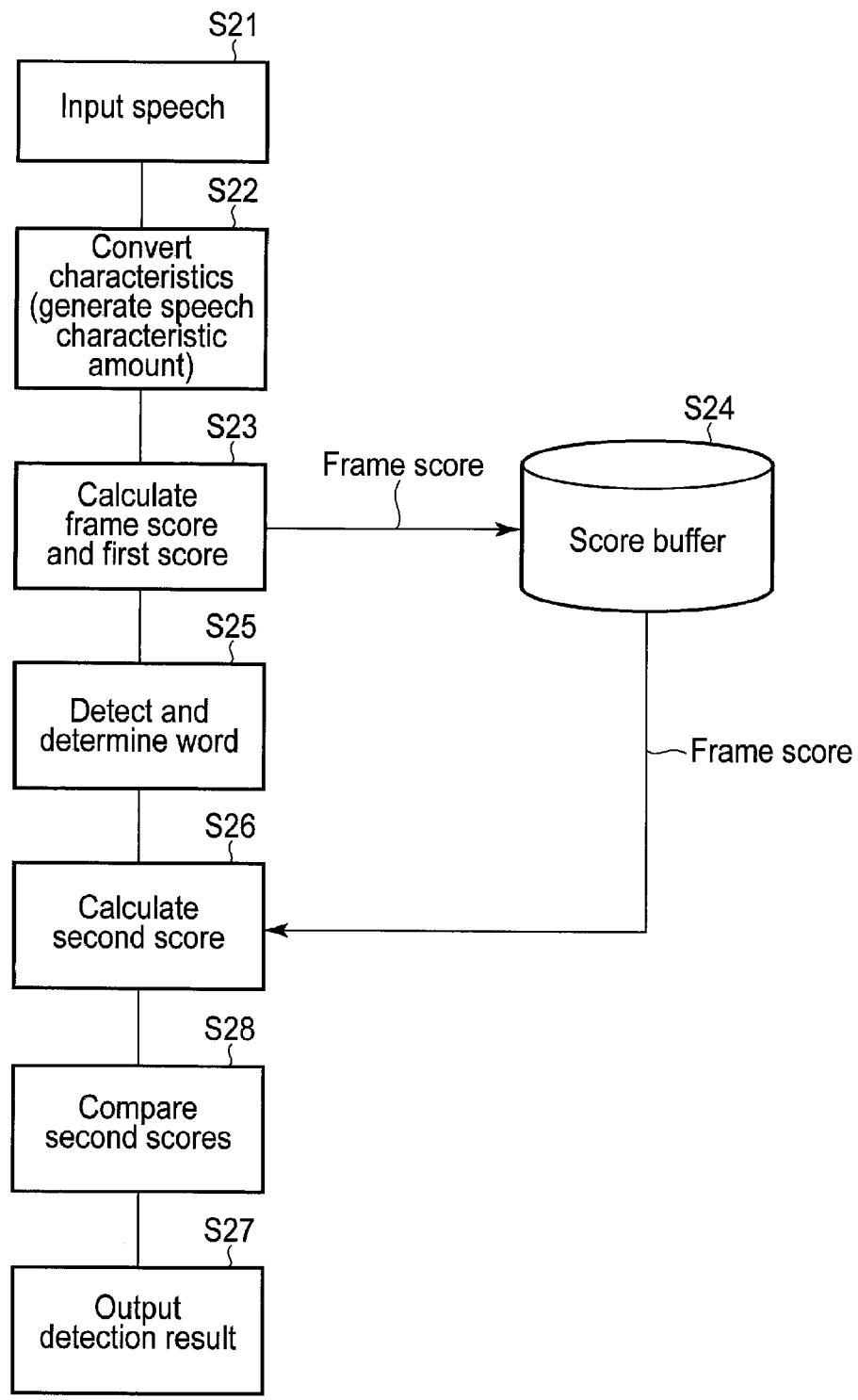
FIG. 8 is a conceptual diagram illustrating a flow of the processings after a second score is calculated from input speech and until a word is determined and output as a second embodiment in the spoken keyword detection apparatus according to the embodiment.

Word detection by sequential detection (first) score calculation is performed at the small calculation amount, the small memory amount, and low delay in the word detection processing performed at the small calculation amount, the small memory amount, and low delay. However, the detection method uses an approximation score or detection-specialized score, and thus it is difficult to compare with the score of another word to be detected, and all the similar words are detected (such as beast and boost). The calculation amount and the memory amount increase for accurate score calculation for comparing the scores. Thus, according to the present embodiment, step S28 of comparing a second score calculation result with the second score of each word as illustrated in FIG. 8 is added to the processings according to the first embodiment illustrated in FIG. 7, thereby reducing erroneous detection of similar words.

Figure 9:
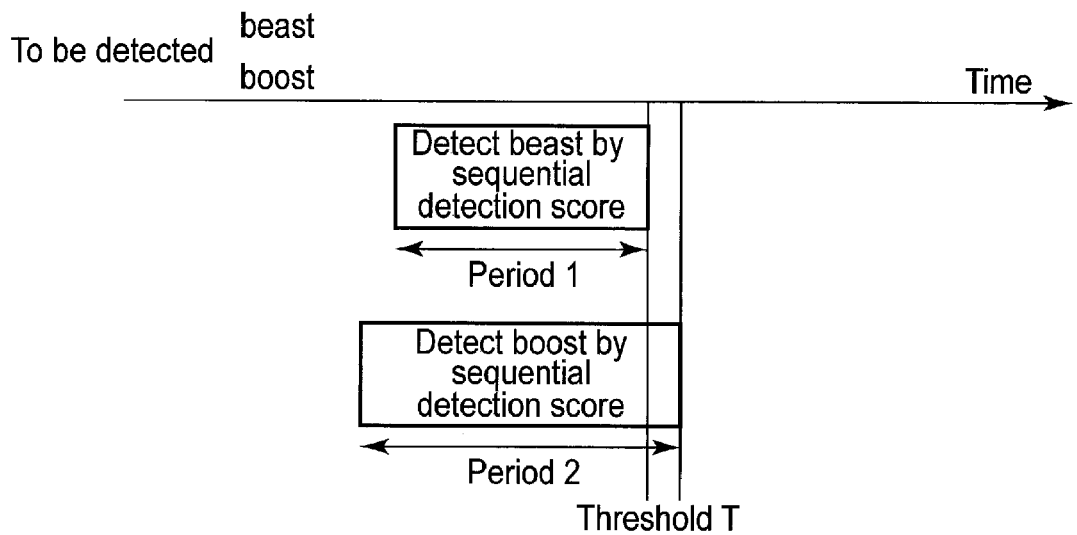
FIG. 9 is a conceptual diagram illustrating a first example of a comparison processing for second scores according to the second embodiment.

FIG. 9 illustrates a first example of the comparison processing. This example assumes that a word is detected and then another word is detected within a preset time threshold. Specifically, "beast" and "boost" are assumed as words to be detected, and the second score of beast for period 1 obtained by the sequential detection score is compared with the second score of boost for period 2 (longer than the period 1 by the threshold T) obtained by the sequential detection score. Here, the second score for the period 1 is higher than the second score for the period 2. The word with the higher score is determined to be likely. Thereby, beast can be output as correct detection result. In this case, it is desirable to comprise the adjustment function of adjusting the time threshold according to user's screen operation.

Figure 10:
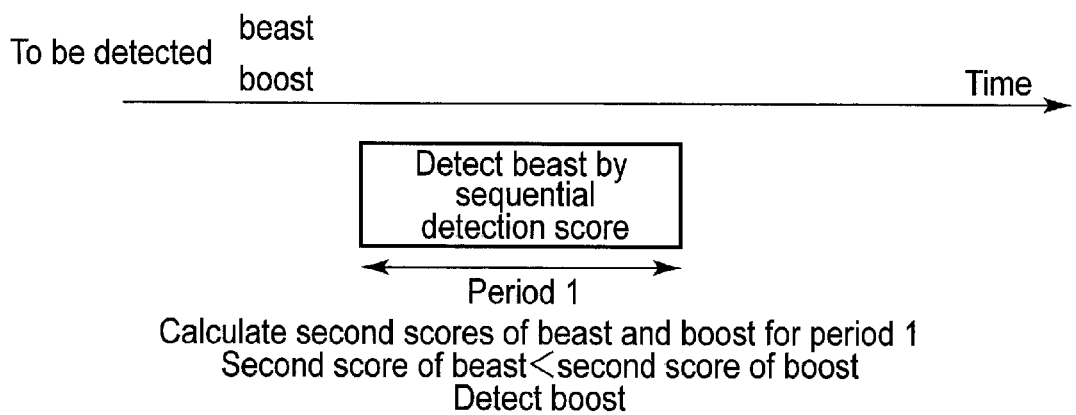
FIG. 10 is a conceptual diagram illustrating a second example of the comparison processing for second scores according to the second embodiment.

FIG. 10 illustrates a second example of the comparison processing. This example assumes that a word is detected and then another candidate word similar to the detected word needs to be considered. Specifically, when "beast" is to be detected, if "boost" is registered as a similar candidate word, the second scores of beast and boost for the period 1 are calculated and the second score of beast is compared with the second score of boost. Here, the second score of boost is higher than the second score of beast. The word with the higher score is determined to be likely. Thereby, boost can be output as correct detection result. In this case, it is desirable to comprise the function of selecting whether to calculate the second score of a candidate word to be detected according to user's screen operation.

FIG. 11 illustrates a third example of the comparison processing. This example is a combination of the respective processings according to the first and second embodiments, and assumes that "beast" and "boost" are to be detected, the second scores of beast and boost for the period 1 are calculated, the second scores of beast and boost for the period 2 (longer than the period 1 by the threshold T) are calculated, and a word to be detected having the highest second score out of the calculated second scores is output as correct detection result. Thereby, a word can be detected with high accuracy.

In order to simplify calculation and comparison of the second scores, the second scores of only user-designated keywords are calculated and compared, the second scores of a pair of user-designated keywords (such as Turn on/Turn off) for the respective detection periods are calculated and compared, or the second scores are automatically determined based on closeness of edit distance of designated characters or phonemes. For example, when four keywords Hello, Good-by, Turn on, and Turn off are registered, the distances of Hello and Good-by are longer than the edit distance between Turn on and Turn off, and thus the second scores do not need to be calculated. In this case, the distance is not limited to the edit distance. Calculation and comparison of the second scores are simplified in this way, thereby remarkably reducing the processing time. There may be employed a method in which a dummy keyword having the edit distance close to a keyword is put in the keyword list in addition to the keywords to be detected, and when the dummy keyword is detected, it is discarded. For example, a dummy keyword Turn of is put in the keyword list including Turn on and Turn off, and if Turn of is detected, it is discarded.

Third Embodiment

In the description of the embodiments, the period in which the second score is calculated is assumed as detection start-end period ($t_{ms}$, $t_e$), but a margin d frame may be added to the start or end to widen the period and the second score may be found. When the end time is provided with the margin d, the processing for the margin d frame needs to be waited. When the Viterbi algorithm is applied forward for the time, the maximum accumulative score can be sequentially calculated per added frame by the characteristics of the algorithm for the period with the fixed start and the changing end. Therefore, the highest second score in the margin d frame may be assumed as the second score of the keyword. If the Viterbi algorithm is performed backward in the temporal direction with the end fixed, a similar result can be caused by the changing start. The maximum score in a combination of the changes in the start and end margins may be assumed as second score.

Figure 12:
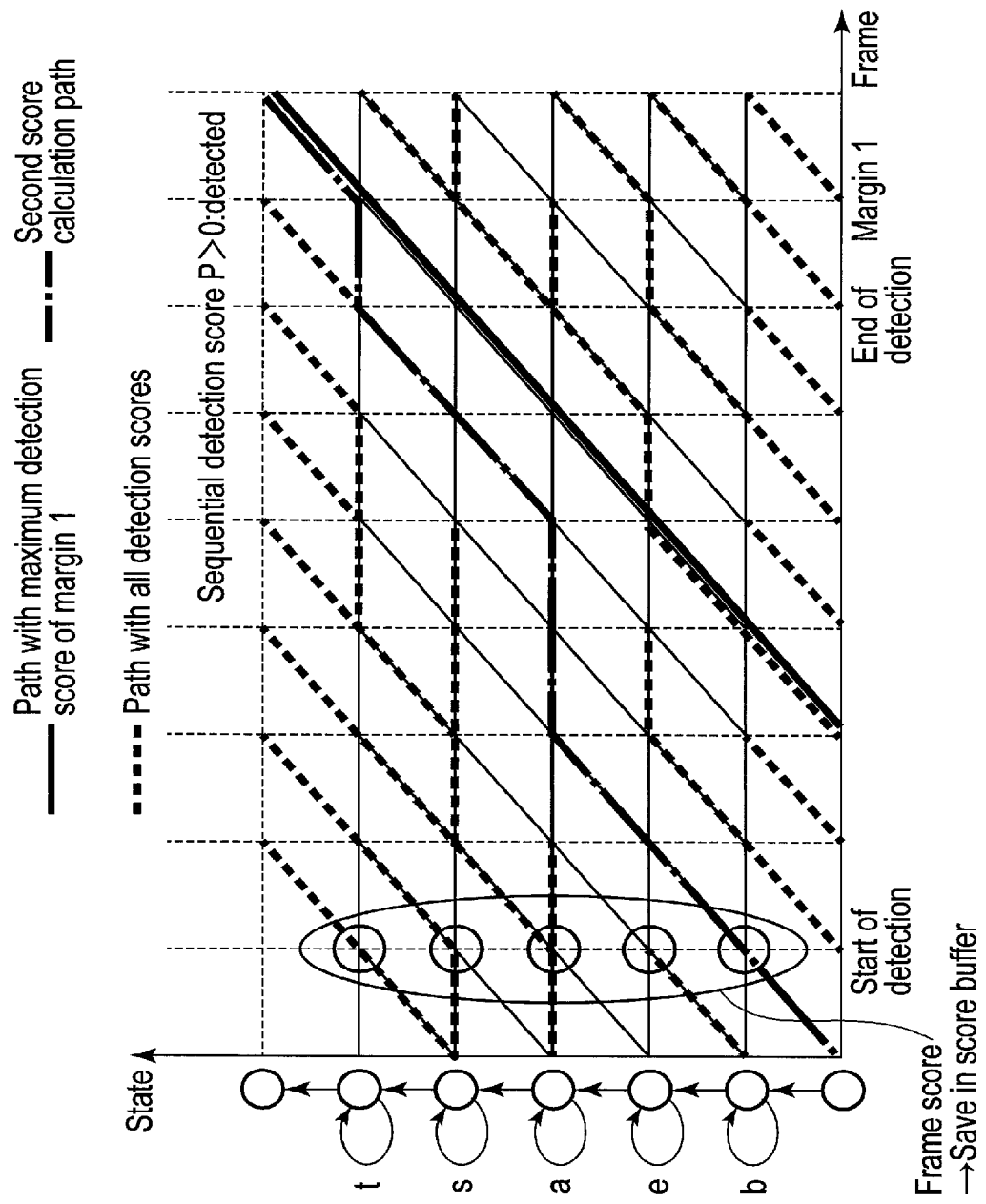
FIG. 12 is a state transition diagram illustrating a specific example of operation of a keyword's second score calculation unit according to the third embodiment.

A specific operation of the keyword's second score calculation unit 34 will be described by way of example assuming that a word "beast" is detected from input speech with reference to FIG. 12. Here, the third embodiment is different from those described above in a margin frame ($t_{ms}$, $t_e$+d) is added, and the flow of processing is similar to that of FIG. 7, a detailed explanation thereof will be omitted. FIG. 12 illustrates frame number (frame) on the horizontal axis (temporal axis) and state transition (state) on the vertical axis. The sequential detection score in the figure is equivalent to the first score (average local score) described in the previous embodiments. The description will be made assuming a detection threshold for the first score of 0. A dotted line in the figure indicates a path with all the detection scores, a solid line indicates a path having a maximum detection score when the sequential detection score P is margin 1, and a chained line indicates a second score calculation path. FIG. 12 shows an example of the case where the margin 1 is added to the end time, but the path of the detection score and the second score calculation path may change.

As described above, according to the present embodiment, a keyword can be rapidly and accurately detected and output from input speech, and can be effectively used to control a device capable of designating and inputting a spoken keyword.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A word detection system comprising:
    an acquisition device that acquires speech data including a plurality of frames and to generate a speech characteristic amount;
    a first calculator that calculates a frame score by matching a reference model based on the speech characteristic amount associated with a target word with the frames in the speech data, and to calculate a first score of the word from the frame score;
    a holder that holds the frame score of the word;
    a detector that detects the word from the speech data based on the first score and outputs time information on a start and an end of the detected word;
    a second calculator that calculates a second score of the word based on the time information on the start and the end of the detected word and the frame score held in the holder; and
    a processor that compares a value of the second score with the second scores of a plurality of words or a preset threshold score or with both of them, and determines a word to be output based on the comparison result,
    wherein the processor further compares the second scores of a plurality of words based on a calculation result of the second score, and determines a word to be output based on the comparison results, and
    wherein when a word is detected and then another word is detected within a preset time threshold, the processor compares the second scores, and determines a word to be output based on the comparison result.

2. The word detection system according to claim 1, wherein the reference model is based on any of phoneme, phonology, phonetic representation, and notation characters generated as the speech characteristic amount.

3. The word detection system according to claim 1, wherein after a word is detected, the processor compares with the second score of a candidate word to be detected different from a word detected by the time information on the start and the end of the word, and determines a word to be output based on the comparison result.

4. The word detection system according to claim 1, further comprising:
an adjustment device that adjusts the time threshold according to user's screen operation.

5. The word detection system according to claim 3, further comprising:
a selector that selects whether to calculate a second score of the candidate word to be detected according to user's screen operation.

6. The word detection system according to claim 3, wherein the processor determines whether to calculate a second score of the candidate word to be detected based on a distance between words.

7. A word detection method comprising:
acquiring speech data including a plurality of frames and generating a speech characteristic amount;
calculating a frame score by matching a reference model based on the speech characteristic amount associated with a target word with the frames in the speed data, and calculating a first score of the word from the frame score;
holding the frame score of the word;
detecting the word from the speech data based on the first score and outputting time information on a start and an end of the detected word;
calculating a second score of the word based on the time information on the start and the end of the detected word and the held frame score;
comparing a value of the second score with the second scores of a plurality of words or a preset threshold score or with both of them;
determining a word to be output based on the comparison result;
comparing the second scores of a plurality of words based on a calculation result of the second score, and determining a word to be output based on the comparison results; and
wherein when a word is detected and then another word is detected within a preset time threshold, comparing the second scores, and determining a word to be output based on the comparison result.

8. A non-transitory computer-readable storage comprising a computer program that is executable by a computer used in a word detection program to perform a processing of detecting a word from user's speech, the computer program comprising instructions for causing the computer execute functions of:
acquiring speech data including a plurality of frames and generating a speech characteristic amount;
calculating a frame score by matching a reference model based on the speech characteristic amount associated with a target word with the frames in the speech data, and calculating a first score of the word from the frame score;
holding the frame score of the word;
detecting the word from the speech data based on the first score and outputting time information on a start and an end of the detected word;
calculating a second score of the word based on the time information on the start and the end of the detected word and the held frame score;
comparing a value of the second score with the second scores of a plurality of words or a preset threshold score or with both of them;
determining a word to be output based on the comparison result;
comparing the second scores of a plurality of words based on a calculation result of the second score, and determining a word to be output based on the comparison results, and
wherein when a word is detected and then another word is detected within a preset time threshold, comparing the second scores, and determining a word to be output based on the comparison result.

* * * * *